(12) United States Patent
Aggarwal et al.

(10) Patent No.: US 8,382,370 B2
(45) Date of Patent: Feb. 26, 2013

(54) THERMOCOUPLE ASSEMBLY WITH GUARDED THERMOCOUPLE JUNCTION

(75) Inventors: Ravinder K. Aggarwal, Gilbert, AZ (US); Robert C. Haro, Gilbert, AZ (US)

(73) Assignee: ASM America, Inc., Phoenix, AZ (US)

( * ) Notice: Subject to any disclaimer, the term of this patent is extended or adjusted under 35 U.S.C. 154(b) by 361 days.

(21) Appl. No.: 12/436,300

(22) Filed: May 6, 2009

(65) Prior Publication Data

US 2010/0282163 A1 Nov. 11, 2010

(51) Int. Cl.
*G01K 7/02* (2006.01)
*G01K 1/14* (2006.01)
*H01L 35/04* (2006.01)

(52) U.S. Cl. ........ 374/179; 374/141; 374/163; 374/208; 136/200

(58) Field of Classification Search .................. 374/100, 374/141, 163, 183, 185, 179, 208; 136/200
See application file for complete search history.

(56) References Cited

U.S. PATENT DOCUMENTS

| | | | |
|---|---|---|---|
| 154,695 A | 9/1874 | Manly | |
| 2,059,480 A | 11/1936 | Obermaier | |
| 2,266,416 A | 12/1941 | Duclos | |
| 2,563,931 A * | 8/1951 | Harrison | 136/224 |
| 2,660,061 A | 11/1953 | Lewis | |
| 3,011,006 A | 11/1961 | Nicholson | |
| 3,038,951 A * | 6/1962 | Mead | 136/234 |
| 3,263,502 A | 8/1966 | Springfield | |
| 3,588,192 A | 6/1971 | Drutchas et al. | |
| 3,867,205 A * | 2/1975 | Schley | 136/232 |
| 3,913,058 A | 10/1975 | Nishio et al. | |
| 4,093,491 A | 6/1978 | Whelpton et al. | |
| 4,217,463 A | 8/1980 | Swearingen | |
| 4,234,449 A | 11/1980 | Wolson et al. | |
| 4,355,912 A | 10/1982 | Haak | |
| 4,377,347 A | 3/1983 | Hanmyo et al. | |
| 4,444,990 A * | 4/1984 | Villar | 136/221 |
| 4,454,370 A | 6/1984 | Voznick | |
| 4,527,005 A | 7/1985 | Mckelvey | |
| 4,592,307 A | 6/1986 | Jolly | |

(Continued)

FOREIGN PATENT DOCUMENTS

| | | |
|---|---|---|
| CN | 1815155 | 8/2006 |
| CN | 102439402 | 5/2012 |

(Continued)

OTHER PUBLICATIONS

Non-Final Office Action for U.S. Appl. No. 12/121,085 dated Apr. 28, 2010.

(Continued)

*Primary Examiner* — Gail Verbitsky (74) *Attorney, Agent, or Firm* — Snell & Wilmer L.L.P.

(57) ABSTRACT

An improved thermocouple assembly for providing a temperature measurement is provided. The thermocouple assembly includes a sheath having a measuring tip, a support member received within the sheath, and first and second wires disposed within the support member. An end of each of the first and second wires are fused together to form a thermocouple junction therebetween. A recessed region is formed in a distal end of the support member, and the thermocouple junction is fixedly located at the base of the recessed region such that the recessed region maintains the thermocouple junction in a substantially fixed position relative to the measuring tip of the sheath.

9 Claims, 4 Drawing Sheets

U.S. PATENT DOCUMENTS

| | | | |
|---|---|---|---|
| 4,692,556 A | 9/1987 | Bollen et al. | |
| 4,721,533 A | 1/1988 | Phillippi et al. | |
| 4,721,534 A * | 1/1988 | Phillippi et al. | 136/234 |
| 4,749,416 A | 6/1988 | Greenspan | |
| 4,830,515 A | 5/1989 | Cortes | |
| 4,934,831 A * | 6/1990 | Volbrecht | 374/183 |
| 4,976,996 A | 12/1990 | Monkowski et al. | |
| 4,978,567 A | 12/1990 | Miller | |
| 4,984,904 A | 1/1991 | Nakano et al. | |
| 4,989,992 A | 2/1991 | Piai | |
| 5,027,746 A | 7/1991 | Frijlink | |
| 5,065,698 A | 11/1991 | Koike | |
| 5,071,258 A * | 12/1991 | Usher et al. | 374/140 |
| 5,104,514 A | 4/1992 | Quartarone | |
| 5,108,192 A | 4/1992 | Mailliet et al. | |
| 5,158,128 A | 10/1992 | Inoue et al. | |
| 5,176,451 A * | 1/1993 | Sasada et al. | 374/179 |
| 5,181,779 A | 1/1993 | Shia | |
| 5,246,500 A | 9/1993 | Samata et al. | |
| 5,271,967 A | 12/1993 | Kramer et al. | |
| 5,294,778 A | 3/1994 | Carman et al. | |
| 5,315,092 A | 5/1994 | Takahashi et al. | |
| 5,336,327 A | 8/1994 | Lee | |
| 5,360,269 A | 11/1994 | Ogawa et al. | |
| 5,374,315 A | 12/1994 | Deboer et al. | |
| 5,421,893 A | 6/1995 | Perlov | |
| 5,456,761 A | 10/1995 | Auger et al. | |
| 5,474,618 A | 12/1995 | Allaire | |
| 5,493,987 A | 2/1996 | McDiarmid et al. | |
| 5,514,439 A | 5/1996 | Sibley | |
| 5,527,111 A | 6/1996 | Lysen et al. | |
| 5,562,774 A | 10/1996 | Breidenbach et al. | |
| 5,571,333 A | 11/1996 | Kanaya | |
| 5,611,265 A | 3/1997 | Ronci et al. | |
| 5,697,706 A | 12/1997 | Ciaravino et al. | |
| 5,716,133 A * | 2/1998 | Hosokawa et al. | 374/121 |
| 5,753,835 A * | 5/1998 | Gustin | 73/866.5 |
| 5,788,799 A | 8/1998 | Steger et al. | |
| 5,791,782 A * | 8/1998 | Wooten et al. | 374/208 |
| 5,806,980 A * | 9/1998 | Berrian | 374/179 |
| 5,902,407 A | 5/1999 | deBoer et al. | |
| 5,904,778 A | 5/1999 | Lu et al. | |
| 5,910,221 A | 6/1999 | Wu | |
| 6,056,823 A | 5/2000 | Sajoto et al. | |
| 6,066,209 A | 5/2000 | Sajoto et al. | |
| 6,102,565 A * | 8/2000 | Kita et al. | 374/179 |
| 6,120,640 A | 9/2000 | Shih et al. | |
| 6,121,061 A | 9/2000 | Van Bilsen et al. | |
| 6,129,808 A | 10/2000 | Wicker et al. | |
| 6,170,429 B1 | 1/2001 | Schoepp et al. | |
| 6,193,414 B1 * | 2/2001 | Balzano | 374/208 |
| 6,227,140 B1 | 5/2001 | Kennedy | |
| 6,235,858 B1 | 5/2001 | Swarup et al. | |
| 6,243,654 B1 | 6/2001 | Johnson et al. | |
| 6,257,758 B1 | 7/2001 | Culbertson | |
| 6,325,858 B1 | 12/2001 | Wengert et al. | |
| 6,342,691 B1 | 1/2002 | Johnsgard et al. | |
| 6,580,050 B1 | 6/2003 | Miller et al. | |
| 6,676,290 B1 * | 1/2004 | Lu | 374/163 |
| 7,008,802 B2 | 3/2006 | Lu | |
| 7,090,394 B2 * | 8/2006 | Hashikura et al. | 374/179 |
| 7,166,165 B2 | 1/2007 | Halpin | |
| 7,274,867 B2 | 9/2007 | Peukert | |
| 7,651,269 B2 * | 1/2010 | Comendant | 374/208 |
| 7,789,559 B2 * | 9/2010 | Waser et al. | 374/179 |
| 7,871,198 B2 | 1/2011 | Rempe et al. | |
| 7,874,726 B2 | 1/2011 | Jacobs et al. | |
| 7,946,762 B2 | 5/2011 | Yednak, III | |
| 8,046,193 B2 | 10/2011 | Yetter, Jr. et al. | |
| 8,100,583 B2 * | 1/2012 | Conner et al. | 374/179 |
| 2002/0011211 A1 | 1/2002 | Halpin | |
| 2002/0043337 A1 | 4/2002 | Goodman et al. | |
| 2003/0002562 A1 | 1/2003 | Yerlikaya et al. | |
| 2003/0035905 A1 | 2/2003 | Lieberman et al. | |
| 2003/0192435 A1 | 10/2003 | McNair | |
| 2005/0092733 A1 | 5/2005 | Ito et al. | |
| 2005/0101843 A1 | 5/2005 | Quinn et al. | |
| 2005/0141591 A1 | 6/2005 | Sakano | |
| 2006/0026314 A1 | 2/2006 | Franchuk et al. | |
| 2006/0275933 A1 * | 12/2006 | Du Bois et al. | 438/14 |
| 2007/0062439 A1 | 3/2007 | Wada et al. | |
| 2007/0119377 A1 * | 5/2007 | Halpin | 118/724 |
| 2007/0258506 A1 * | 11/2007 | Schwagerman et al. | 374/179 |
| 2008/0043803 A1 | 2/2008 | Bandoh | |
| 2008/0205483 A1 | 8/2008 | Rempe et al. | |
| 2008/0228306 A1 | 9/2008 | Yetter et al. | |
| 2008/0289574 A1 | 11/2008 | Jacobs et al. | |
| 2009/0034582 A1 * | 2/2009 | Carcasi | 374/141 |
| 2009/0052498 A1 | 2/2009 | Halpin et al. | |
| 2009/0159000 A1 | 6/2009 | Aggarwal et al. | |
| 2009/0308425 A1 | 12/2009 | Yednak, III | |
| 2010/0145547 A1 | 6/2010 | Darabnia et al. | |
| 2010/0282163 A1 | 11/2010 | Aggarwal et al. | |

FOREIGN PATENT DOCUMENTS

| | | |
|---|---|---|
| CN | 102439712 | 5/2012 |
| EP | 0229488 | 7/1987 |
| EP | 0723141 | 7/1996 |
| EP | 0887632 | 12/1998 |
| FR | 1408266 | 8/1965 |
| GB | 0752277 | 7/1956 |
| JP | 5819462 | 4/1982 |
| JP | 7-209093 | 8/1985 |
| JP | 02185038 | 7/1990 |
| JP | 5-64627 | 3/1993 |
| JP | 05023079 | 3/1993 |
| JP | 05118928 | 5/1993 |
| JP | 09089676 | 4/1997 |
| JP | 10-153494 | 6/1998 |
| JP | 10-227703 | 8/1998 |
| JP | 11-118615 | 4/1999 |
| JP | 11-183264 | 7/1999 |
| JP | 11-183265 | 7/1999 |
| JP | 11287715 | 10/1999 |
| JP | 2004113270 | 4/2004 |
| JP | 2005172489 | 6/2005 |
| JP | 2006-090762 | 4/2006 |
| JP | 2006-153706 | 6/2006 |
| KR | 10-2000-0031098 | 6/2000 |
| KR | 10-2002-0086763 | 11/2002 |
| KR | 10-2003-0092305 | 12/2003 |
| WO | 9531582 | 11/1995 |
| WO | 9706288 | 2/1997 |
| WO | 9923276 | 5/1999 |
| WO | 9923690 | 5/1999 |
| WO | 0111223 | 2/2001 |

OTHER PUBLICATIONS

International Search Report and Written Opinion for International Application No. PCT/US2009/066377 dated Jul. 1, 2010.

Introduction to Materials Science for Engineers, 3rd Ed., James F. Schackelford, pp. 398, Macmillan Publishing Co. (1992).

Linke, J. and Vietzke, E., "Behavior of Boron Doped Graphites, Plasma Sprayed Boron Carbides and a-C/B H as Plasma Facing Material," J. Fusion Tech., V.20, pp. 228-231 (Sep. 1991).

Ponnekanti et al., "Failure Mechanisms of Anodized Aluminum Parts Used in Chemical Vapor Deposition Chambers," J. Vac. Sci. Technol. A 14(3) (May 1, 1996).

"Thermocouples for Silicon Process Technologies," Vulcan Electric Company brochure.

"Thermocouples for the Semiconductor Industry," Engelhard Corporation brochure (2004).

PCT Notification of Transmittal of the International Search Report and the Written Opinion of the International Searching Authority, or the Declaration, dated Aug. 21, 2008, for International App. No. PCT/US2008/063919.

PCT Notification of Transmittal of the International Search Report and the Written Opinion of the International Searching Authority, or the Declaration, dated Mar. 5, 2009 for International App. No. PCT/US2008/074063.

PCT Notification of Transmittal of the International Search Report and the Written Opinion of the International Searching Authority, or the Declaration, dated Nov. 27, 2009, for International App. No. PCT/US2009/043454.

Notice of Allowance dated Jul. 26, 2010 in U.S. Appl. No. 12/121,085.
Notice of Allowance dated Oct. 4, 2010 in U.S. Appl. No. 12/121,085.
CN; Office Action dated Jul. 14, 2010 in Application No. 200880012927.X.
PCT; International Search Report and Written Opinion dated Jul. 29, 2010 in Application No. PCT/US2010/033248.
USPTO; Office Action dated Sep. 13, 2010 in U.S. Appl. No. 12/140,809.
International Search Report and Written Opinion for Application No. PCT/US2010/033252 dated Jan. 28, 2011.
Final Office Action for U.S. Appl. No. 12/140,809 dated Dec. 28, 2010.
International Search Report and Written Opinion for International Application No. PCT/US2010/033244 dated Jun. 29, 2010.
International Preliminary Report on Patentability dated Jun. 23, 2011 in Application No. PCT/US2009/066377.
Non-Final Office Action dated Mar. 15, 2011 for U.S. Appl. No. 12/193,924.
Notice of Allowance dated Mar. 17, 2011 for U.S. Appl. No. 12/140,809.
Non-Final Office Action dated Jul. 28, 2011 for U.S. Appl. No. 12/330,096.
Examination Report Dated May 26, 2011 for App. No. 09733043.5-2313.
Non-Final Office Action dated Aug. 3, 2011 for U.S. Appl. No. 12/436,315.
Final Office Action dated Sep. 30, 2011 for U.S. Appl. No. 12/193,924.
Notice of Allowance for U.S. Appl. No. 12/436,315 dated Nov. 17, 2011.
IPRP for PCT/US2010/033244 dated Nov. 17, 2011.
IPRP for PCT/US2010/033248 dated Nov. 17, 2011.
IPRP for PCT/US2010/033252 dated Nov. 17, 2011.
International Preliminary Report on Patentability for International Application No. PCT/US2010/033244 dated Nov. 9, 2011.
International Preliminary Report on Patentability for International Application No. PCT/US2008/074063 dated Feb. 24, 2010.
Office Action dated Jun. 4, 2012 in Japanese Application No. 2011-514650.
Notice of Allowance dated Jun. 7, 2012 in U.S. Appl. No. 12/330,096.
Restriction Requirement for U.S. Appl. No. 12/436,306 dated Dec. 20, 2011.
Official Action for Japanese Patent Application 2010-522075 dated Dec. 20, 2011.
Final Office Action dated Jan. 13, 2012 for U.S. Appl. No. 12/330,096.
Notice of Allowance dated Mar. 6, 2012 for U.S. Appl. No. 12/330,096.
Non-Final Office Action dated Mar. 20, 2012 for U.S. Appl. No. 12/330,096.
Non-Final Office Action dated Apr. 11, 2012 for U.S. Appl. No. 12/436,306.
Official Action for Japanese Patent Application 2010-522075 mailed on Apr. 13, 2012.

* cited by examiner

THERMOCOUPLE ASSEMBLY WITH GUARDED THERMOCOUPLE JUNCTION

FIELD OF THE INVENTION

The present invention relates to temperature measuring devices, and more particularly, this invention relates to a thermocouple assembly for use in semiconductor processing.

BACKGROUND OF THE INVENTION

Semiconductor processing chambers are used for depositing various material layers onto a substrate surface or surfaces. The processing chambers can be used for low-temperature processing, high-temperature processing, or a combination of both high- and low-temperature processing. One or more substrates or workpieces, such as silicon wafers, are placed on a workpiece support within the processing chamber. Both the substrate and workpiece support are heated to a desired temperature. In a typical chemical vapor deposition ("CVD") processing step, reactant gases are passed over each heated substrate, whereby a CVD reaction deposits a thin layer of the reactant material in the reactant gases on the substrate surface(s). The processing may also include atomic layer deposition ("ALD"), plasma enhanced atomic layer deposition ("PEALD"), reduced pressure CVD ("RPCVD"), or any other process for depositing a thin layer of material onto a substrate. Through subsequent processes, these layers are made into integrated circuits, and tens to thousands or even millions of integrated devices, depending on the size of the substrate and the complexity of the circuits.

Various process parameters must be carefully controlled to ensure the high quality of the resulting deposited layers. One such critical parameter is the temperature of the substrate during each processing step. During CVD, for example, the deposition gases react at particular temperatures to deposit the thin layer on the substrate. If the temperature varies greatly across the surface of the substrate, the deposited layer could be uneven or have defects which may result in unusable areas on the surface of the finished substrate. Accordingly, it is important that the substrate temperature be stable and uniform while the reactant gases are introduced into the processing chamber.

Similarly, non-uniformity or instability of temperatures across a substrate during other thermal treatments can affect the uniformity of resulting structures on the surface of the substrate. Other processes for which temperature control can be critical include, but are not limited to, oxidation, nitridation, dopant diffusion, sputter depositions, photolithography, dry etching, plasma processes, and high temperature anneals.

Methods and systems are known for measuring the temperature at various locations near and immediately adjacent to the substrate being processed. Typically, thermocouples are disposed at various locations near the substrate being processed, and these thermocouples are operatively connected to a controller to assist in providing a more uniform temperature across the entire surface of the substrate. For example, U.S. Pat. No. 6,121,061 issued to Van Bilsen teaches a plurality of temperature sensors measuring the temperature at various points surrounding the substrate, including a thermocouple placed near the leading edge of the substrate, another near the trailing edge, one adjacent to a side of the substrate, and another below the substrate near the center of thereof.

Thermocouples used in semiconductor processing chambers typically have an elongated sheath to protect the thermocouple wires disposed therewithin from the gases and reactants introduced into the reaction chamber. The thermocouple typically also includes a support member that extends the length of the sheath and is configured to receive a pair of wires formed of dissimilar metals such that they form a thermocouple therebetween. The lifetime of the thermocouples is important in a semiconductor processing tool because a shorter lifetime requires more frequent down-time in an industry in which throughput, or the number of workpieces processed over a given time, is an important indicator of quality and cost of ownership of the entire tool. Accordingly, it is important that thermocouples are able to withstand cyclical changes in temperature as well as pressure. Typical issues that relate to shortened thermocouple lifetime include broken wires and inconsistent temperature measurement. The inconsistent temperature measurement of thermocouples may result from an inconsistent location of the junction of the wires (i.e., thermocouple junction) relative to the measuring tip of the sheath. When the location of the junction varies, the accuracy and consistency of the temperature measurement decreases. One example of when a thermocouple is considered to have failed is when the temperature measured is not accurate or is inconsistent from measurement to measurement. The reaction chamber must subsequently be shut down so that the failed thermocouple can be removed, and the tool down-time decreases profitability and increases cost of ownership of the tool. Accordingly, there is a need for a thermocouple design that provides a consistent position at which the junction is located to prevent the shifting of the junction relative to the sheath.

BRIEF SUMMARY OF THE INVENTION

A need exists for a temperature sensing thermocouple that includes a guarded junction that is spaced-apart from the measuring tip of the sheath that is easily manufacturable such that the gap between the junction and the sheath is readily repeatable between subsequently-produced thermocouples. In one aspect of the present invention, a thermocouple assembly for measuring a temperature within a reaction chamber is provided. The thermocouple includes a sheath having a measuring tip located at a distal end of the sheath. The thermocouple also includes a support member. At least a portion of the support member is received within the sheath. A first wire and a second wire are formed of dissimilar metals and are received within the support member. An end of each of the first and second wires is fused together to form a thermocouple junction therebetween. A recessed region is formed in a distal end of the support member, and the distal end of the support member is received within the sheath. The junction is located immediately adjacent to the base of the recessed region.

In another aspect of the present invention, a thermocouple assembly for measuring temperature within a chemical vapor deposition reactor is provided. The thermocouple assembly includes an elongated support member. The support member is configured to receive at least a portion of a first wire and a second wire therewithin, wherein the first wire and second wire are formed of dissimilar metals. The thermocouple assembly also includes an elongated sheath having a measuring tip. The sheath is configured to receive the support member such that a distal end of the support member contacts an inner surface of the sheath at the measuring tip. The thermocouple assembly further includes a thermocouple junction formed by fusing an end of each of the first and second wires. A recessed region is formed into the distal end of the support member adjacent to the measuring tip, and the junction is maintained at a substantially fixed position relative to the measuring tip of the sheath.

In yet another aspect of the present invention, a temperature control system for use in a semiconductor processing reactor is provided. The temperature control system includes at least one heating element located within the reactor. The temperature control system also includes a controller operatively connected to the heating element(s), and the controller is configured to control the heating element(s). The temperature control system further includes at least one temperature sensor located within the reactor, wherein the temperature sensor is operatively connected to the controller for providing temperature data to the controller. At least one temperature sensor is a thermocouple assembly, and the thermocouple assembly includes a sheath having a measuring tip located at a distal end of the sheath. The thermocouple assembly also includes a support member, wherein at least a portion of the support member is received within the sheath. The thermocouple assembly further includes a first wire and a second wire formed of dissimilar metals, wherein a portion of the first and second wires is received within the support member. An end of each of the first and second wires is fused together to form a thermocouple junction therebetween. A recessed region is formed in a distal end of the support member, and the distal end of said support member is received within the sheath. The distal end of the support member contacts the measuring tip of the sheath. The junction is located at a substantially fixed position relative to the measuring tip of the sheath Advantages of the present invention will become more apparent to those skilled in the art from the following description of the embodiments of the invention which have been shown and described by way of illustration. As will be realized, the invention is capable of other and different embodiments, and its details are capable of modification in various respects. Accordingly, the drawing(s) and description are to be regarded as illustrative in nature and not as restrictive.

DETAILED DESCRIPTION OF THE PREFERRED EMBODIMENT

Figure 1:
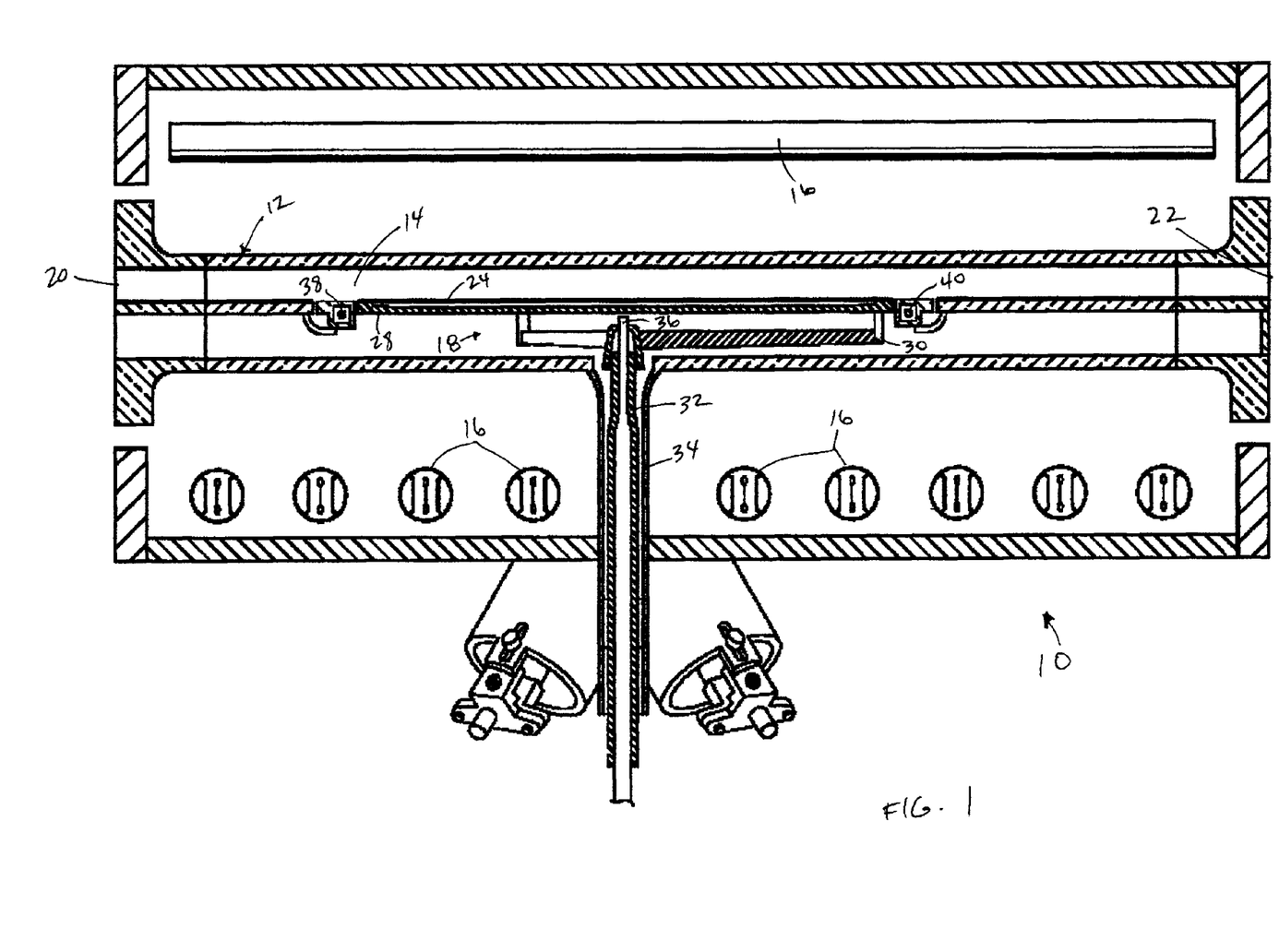
FIG. 1 is cross-sectional view of an embodiment of a CVD reactor.

Referring to FIG. 1, an exemplary embodiment of a chemical vapor deposition ("CVD") reactor 10 for processing semiconductor substrates is shown. While the illustrated embodiment is a single substrate, horizontal flow, cold-wall reactor, it should be understood by one skilled in the art that the thermocouple concept described herein may be used in other types of semiconductor processing reactors as well as other non-semiconductor processing applications that require accurate temperature sensors. The CVD reactor 10 includes a reaction chamber 12 defining a reaction space 14, heating elements 16 located on opposing sides of the reaction chamber 12, and a substrate support mechanism 18. The reaction chamber 12 is an elongated member having an inlet 20 for introducing reactant gases into the reaction space 14 and an outlet 22 through which the reactant gases and process by-products exit the reaction space 14. In an embodiment, the reaction chamber 12 is formed of transparent quartz. It should be understood by one skilled in the art that the reaction chamber 12 may be formed of any other material sufficient to be substantially non-reactive relative to a deposition process therewithin.

The heating elements 16 form an upper bank and a lower bank, as shown in FIG. 1. The heating elements 16 are oriented in a spaced-apart manner relative to adjacent heating elements 16 within the same bank. In an embodiment, the heating elements 16 of the upper bank are oriented substantially perpendicular relative to the heating elements 16 of the lower bank. The heating elements 16 provide radiant energy to the reaction chamber 12 without appreciable absorption by the reaction chamber 12 walls. The heating elements 16 are configured to provide radiant heat that is absorbed by the substrate being processed as well as portions of the substrate support mechanism 18.

The substrate support mechanism 18 includes a substrate holder 28, upon which the substrate 24 may be disposed, and a susceptor support member 30, as shown in FIG. 1. The susceptor support member 30 is connected to a shaft 32 that extends downwardly through a tube 34 depending from the lower wall of the reaction chamber 12. A motor (not shown) is configured to rotate the shaft 32, thereby rotating the substrate holder 28 and substrate 24 in a corresponding manner. In an embodiment, the substrate holder 28 is formed of silicon carbide (SiC) coated graphite and the susceptor support member 30 is formed of transparent quartz. It should be understood by one skilled in the art that the members of the substrate support mechanism 18 can be formed of any material sufficient to be substantially inert with respect to the process gases introduced into the reaction chamber 12 and to support the substrate 24 being processed.

Figure 2:
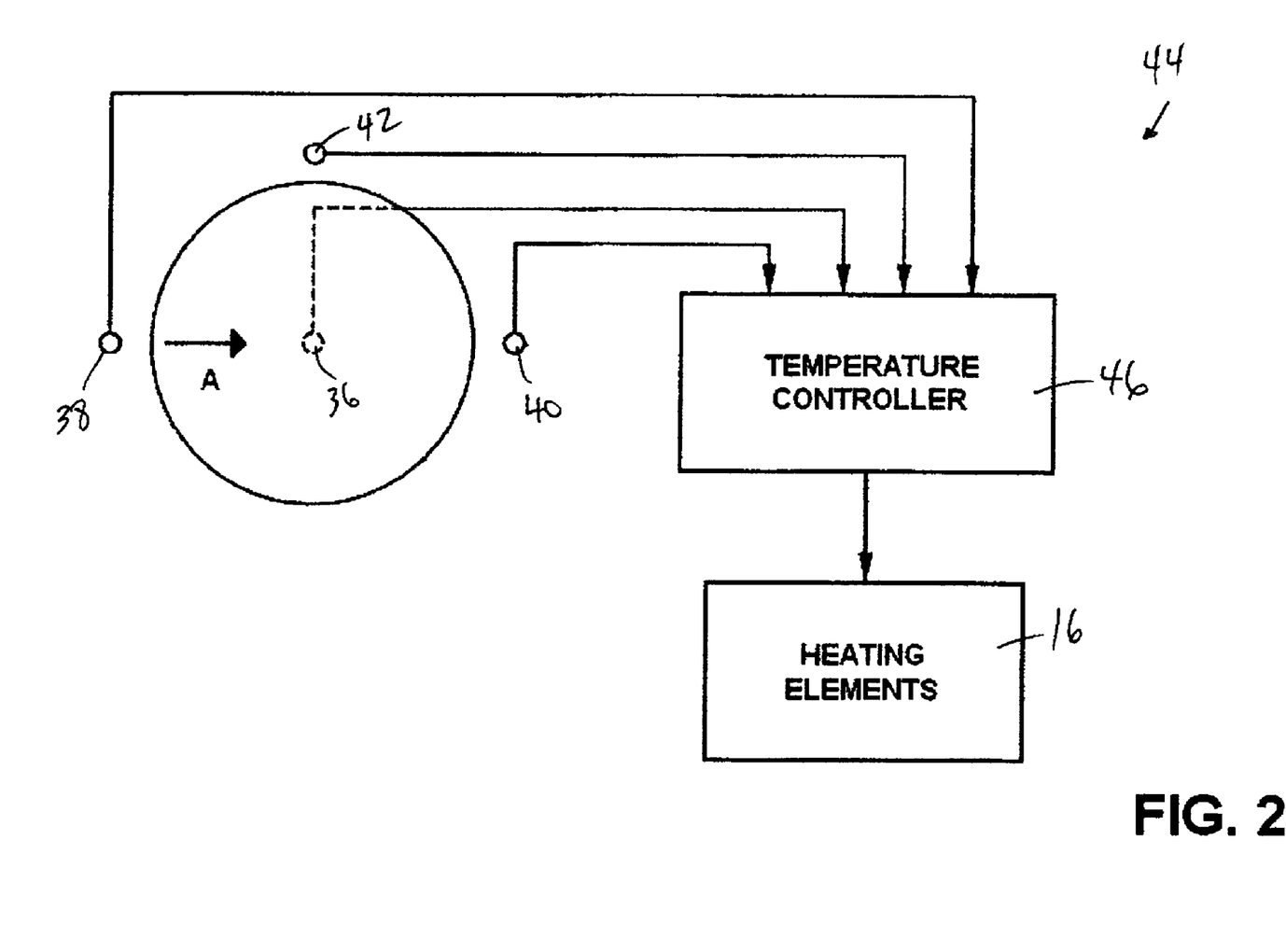
FIG. 2 is a schematic view of an embodiment of a temperature control system.

A plurality of temperature sensors are located adjacent to the substrate 24 and the substrate holder 28 for measuring temperatures at a variety of locations near the substrate 24, as shown in FIGS. 1-2. In the illustrated embodiment, the temperature sensors include: a central temperature sensor 36 disposed within a blind cavity formed in the lower surface of the substrate holder 28, a leading edge temperature sensor 38, a trailing edge temperature sensor 40, and at least one side edge temperature sensor 42. The leading and trailing edge temperature sensors 38, 40 are located adjacent to the front and rear edges of the substrate 24 relative to the direction of flow A of the gases within the reaction space 14. The temperature sensors are configured to measure the temperature in the localized area immediately surrounding the tip of the temperature sensor. A temperature control system 44 for a CVD reactor 10 includes a plurality of temperature sensors 36, 38, 40, 42 located adjacent to a substrate 24 being processed, wherein the temperature sensors are operatively connected to a temperature controller 46 for providing temperature data at the particular location to the controller 46. The controller 46 is operatively connected to at least one heating element 16 disposed adjacent to a substrate 24. The temperature controller 46 is configured to selectively adjust the energy supplied to the heating element(s) 16 in response to data provided by the temperature sensors to maintain a substantially uniform temperature distribution across the entire substrate 24 being processed. It should be understood by one skilled in the art that the temperature control system 44 may include any number of temperature sensors disposed at different locations for providing data to the controller 46.

Figure 3:
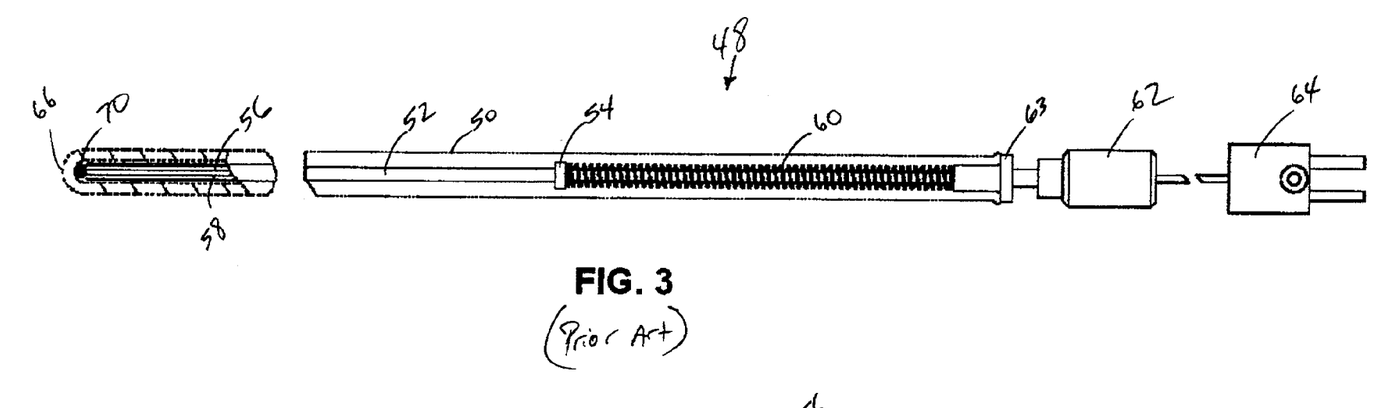
FIG. 3 is an embodiment of a thermocouple assembly.
Figure 4:
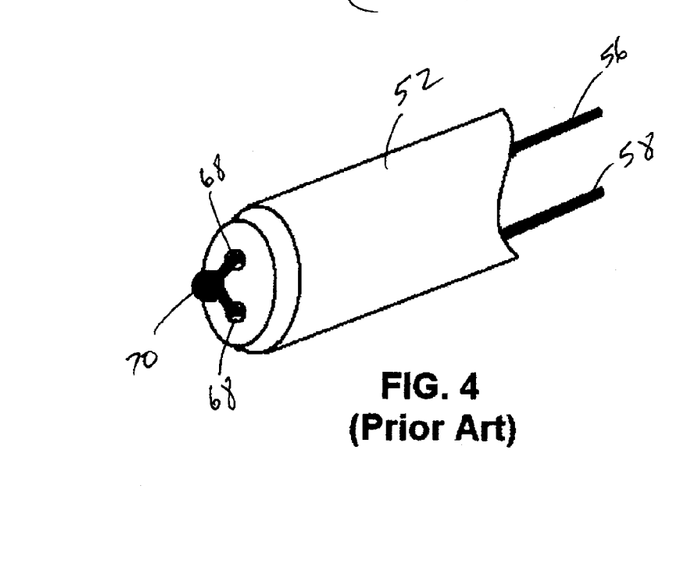
FIG. 4 is a magnified view of a thermocouple junction commonly known in the art.

In an embodiment, a temperature sensor used in the temperature control system 44 is a thermocouple assembly 48. It should be understood by one skilled in the art that the other temperature sensors 36, 38, 40, 42 may be formed as optical pyrometers, thermocouples previously known in the art, and any combination thereof. A typical embodiment of a thermocouple assembly 48 commonly known in the art, as shown in FIGS. 3-4, includes a sheath 50, a support member 52, a collar 54, a first wire 56, a second wire 58, a spring 60, a cap assembly 62, and a plug 64. The sheath 50 is a substantially cylindrical, elongated member having a longitudinal axis. The sheath 50 includes a measuring tip 66 that is configured to be positioned immediately adjacent to the location at which a temperature measurement is desired. The support member 52 is also a substantially cylindrical, elongated member having a longitudinal axis, wherein a portion of the support member 52 is received within the sheath 50. The support member 52 may be formed of any type of ceramic or other material sufficient to withstand the cyclic temperature variations as well as the range of temperatures to which the thermocouple assembly 48 is exposed. The thermocouple assembly 48 can be used as a central temperature sensor 36, leading edge temperature sensor 38, trailing edge temperature sensor 40, and a side edge temperature sensor 42. It should be understood by one skilled in the art that the thermocouple assembly 48 may be used in any other application in which an accurate temperature sensor is needed. It should be understood by one skilled in the art that although the illustrated thermocouple assembly 48 is substantially linear, the thermocouple assembly 48 may be formed of any shape sufficient to allow the measuring tip 66 of the thermocouple assembly 48 to be disposed at a particularly desired location adjacent to the substrate being processed or the substrate support 28 supporting the substrate being processed.

The thermocouple assembly 48 includes a first wire 56 and second wire 58, as shown in FIG. 4, wherein the first and second wires 56, 58 are formed of dissimilar metals. In an embodiment, the first wire 56 is formed of Platinum, and the second wire 58 is formed of a Platinum alloy having 13% Rhodium. It should be understood by one skilled in the art that the first and second wires 56, 58 can be formed of any dissimilar metals sufficient to form a thermocouple therebetween. The first and second wires 56, 58 are received in corresponding bores 68 formed through the center of the support member 52 along the longitudinal axis of the support member 52. A portion of each of the first and second wires 56, 58 extends beyond the end of the support member 52 adjacent to the measuring tip 66 of the sheath 50. In conventional thermocouple assemblies, as shown in FIG. 4, the portion of the first and second wires 56, 58 extending beyond the end of the support member 52 adjacent to the measuring tip 66 are fused together to form a bead, or a thermocouple junction 70. The spring 60 is configured to ensure constant contact between the thermocouple junction 70 and the inner surface of the sheath 50 at the measuring tip 66. It should be understood by one skilled in the art that a spring 60 is typically used in thermocouple assemblies used as a central temperature sensor 36 to maintain the thermocouple junction 70 in contact with the sheath 50, but the spring is not necessary for thermocouple assemblies used at leasing edge, trailing edge, or side edge temperature sensors 38, 40, 42.

The distance between the thermocouple junction 70 and the location at which the thermocouple assembly 48 is measuring the temperature is a vital characteristic of the design of the thermocouple assembly 48. In the process of manufacturing the thermocouple assembly 48, it is also important that the location of the thermocouple junction 70 within the measuring tip 66 is substantially constant from thermocouple-to-thermocouple. The spring 60 is configured to exert a spring force onto the collar 54 that is integrally attached to the support member 52, wherein the spring force applied to the collar 54 biases the collar 54 toward the measuring tip 66 to ensure constant contact between the thermocouple junction 70 and the measuring tip 66. During assembly of thermocouple assemblies previously known in the art, the thermocouple junction 70 may slide, or become offset within the measuring tip 66, thereby reducing the accuracy of the temperature measured by the thermocouple assembly 48. Additionally, during thermal cycling within the reaction chamber 12 (FIG. 1), the changes in temperature may cause the thermocouple junction 70 to slide, or become offset within the measuring tip 66. Further, because the thermocouple junction 70 extends beyond the end of the support member 52 within the sheath 50, the thermocouple junction 70 and a portion of the first and second wires 56, 58 are exposed to the heating elements 16 within the CVD reactor. This direct exposure to the heating elements 16 may cause the damage to the thermocouple junction 70 and the first and second wires 56, 58 during the thermal cycling in the reaction chamber 12. Additionally, because the thermocouple junction 70 extends beyond the end of the support member 52, the thermocouple junction 70 and a portion of the first and second wires 56, 58 are exposed to the heating elements 16 within the reaction chamber. As such, the compressive force of the spring 60 in combination with the elevated temperatures to which the thermocouple junction 70 is exposed can deform the shape of the thermocouple junction 70 over time. This deformation can negatively impact the accuracy of the temperature measured by the thermocouple.

Figure 5:
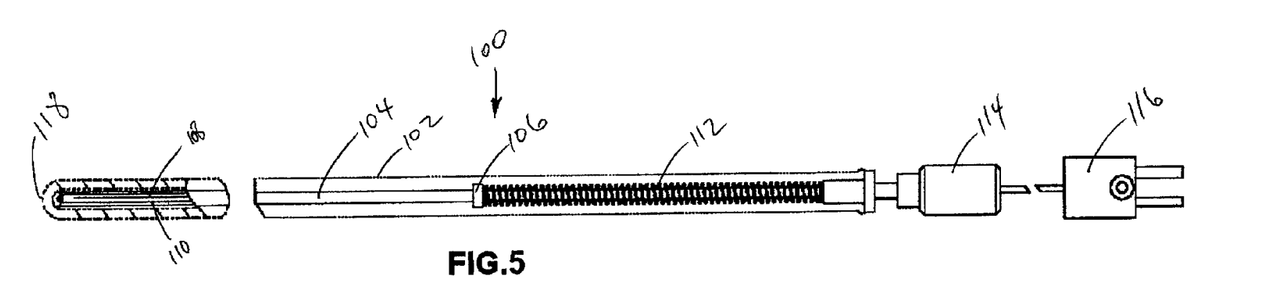
FIG. 5 is an embodiment of a thermocouple assembly having a guarded thermocouple junction.

An exemplary embodiment of an improved thermocouple assembly 100 is shown in FIG. 5. The thermocouple assembly 100 includes sheath 102, a support member 104, a collar 106, a first wire 108, a second wire 110, a spring 112, a cap assembly 114, and a plug 116. In an embodiment, the sheath 102 is a substantially cylindrical, elongated member having a longitudinal axis. The sheath 102 includes a measuring tip 118 that is configured to be positioned immediately adjacent to the location at which a temperature measurement is desired. In an embodiment, the sheath 102 is formed of transparent quartz. It should be understood by one skilled in the art that the sheath 102 may be formed of any material sufficient to withstand the range of temperatures to which the thermocouple assembly 100 is subject within the reaction chamber 12. The support member 104 is also a substantially cylindrical, elongated member having a longitudinal axis, wherein a portion of the support member 104 is received within the sheath 102. It should be understood by one skilled in the art that the support member 104 may be formed as any shape sufficient to be received within a sheath 102. The support member 104 may be formed of ceramic or other material sufficient to withstand the cyclic temperature variations as well as the range of temperatures to which the thermocouple assembly 100 is exposed. The thermocouple assembly 100 can be used as a central temperature sensor 36, leading edge temperature sensor 38, trailing edge temperature sensor 40, and a side edge temperature sensor 42, as shown in FIG. 2. It should be understood by one skilled in the art that the thermocouple assembly 100 may be used in any other application in which an accurate temperature sensor is needed. It should be understood by one skilled in the art that although the illustrated thermocouple assembly 100 is substantially linear, the thermocouple assembly 100 may be formed of any shape sufficient to allow the measuring tip 118 of the thermocouple assembly 100 to be disposed at a particularly desired location.

The thermocouple assembly 100 includes a first wire 108 and second wire 110, as shown in FIG. 5, wherein the first and second wires 108, 110 are formed of dissimilar metals. In an embodiment, the first wire 108 is formed of Platinum, and the second wire 110 is formed of a Platinum alloy having 13% Rhodium. It should be understood by one skilled in the art that the first and second wires 108, 110 can be formed of any dissimilar metals sufficient to form a thermocouple therebetween. The first and second wires 108, 110 are received in corresponding bores 120 formed through the center of the support member 104 along the longitudinal axis of the support member 104.

In an embodiment, the tip of the support member 104 adjacent to the measuring tip 118 forms a recessed region 122, as shown in FIGS. 6A-6D. In the embodiment illustrated in FIG. 6A, the recessed region 122 includes an angled side surface 124. The angled side surface 124 is sloped inwardly toward the longitudinal axis of the support member 104 as the angled side surface 124 extends away from the distal end of the support member 104. A base 126 forms the bottom surface of the recessed region 122 at the end of the support member 104. The base 126 is a substantially flat surface. The recessed region 122 forms a generally truncated conical-shaped indentation into the end of the support member 104. The recessed region 122 is surrounded by an edge 128 forming the distal end of the support member 104. In an embodiment, the angled side surface 124 is spaced radially inward from the outer surface of the support member 104 such that the edge 128 forms a substantially planar ledge. In another embodiment, the angled side surface 124 extends from the outer surface of the support member 104 (not shown) such that the distal end of the support member 104 forms a circular ring. In an embodiment, the recessed region 122 can be formed when molding the support member 104. In another embodiment, the recessed region 122 can be formed by cutting or grinding out a portion of the support member 104. It should be understood by one skilled in the art that the recessed region 122 can be formed by any manner sufficient to provide side walls 138 configured to guard the thermocouple junction 130.

Figure 6A:
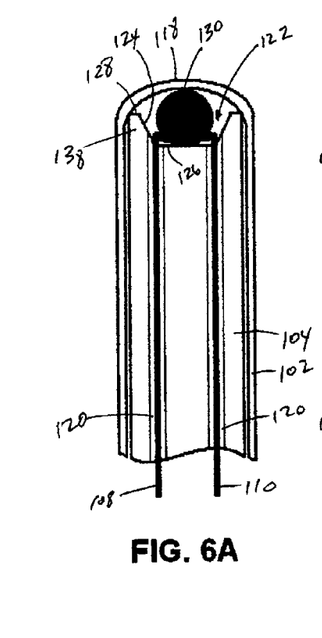
FIG. 6A is a magnified, cross-sectional view of an embodiment of a guarded thermocouple junction.

During assembly, a portion of the first and second wires 108, 110 extend from their corresponding bores 120 into the recessed region 122, as shown in FIG. 6A. The exposed portion of the first and second wires 108, 110 are fused together to form a bead, or thermocouple junction 130. The thermocouple junction 130 is located immediately adjacent to, or in contact with, the base 126 of the recessed region 122 and protected by the angled side surface 124. Once the thermocouple junction 130 is formed, the support member 104 is inserted into the sheath 102 until the edge 128 contacts the inner surface of the sheath 102 at the measuring tip 118. When assembled, the thermocouple junction 130 is located at a substantially fixed location relative to the measuring tip 118 of the sheath 102.

Figure 6B:
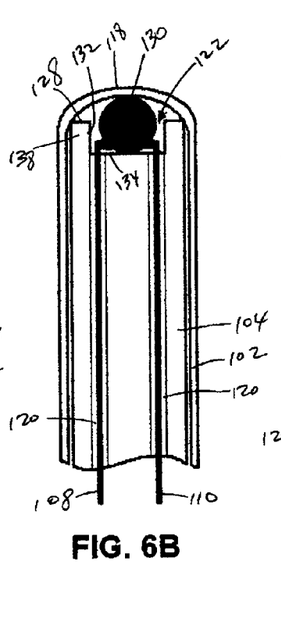
FIG. 6B is a magnified, cross-sectional view of another embodiment of a guarded thermocouple junction.
Figure 6C:
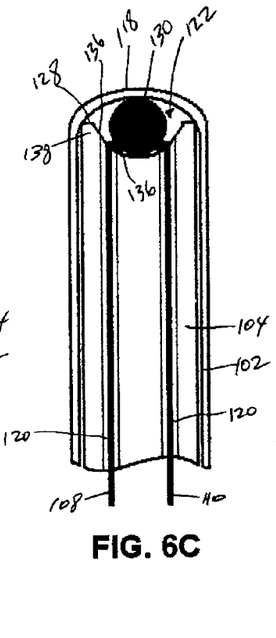
FIG. 6C is a magnified, cross-sectional view of another embodiment of a guarded thermocouple junction.
Figure 6D:
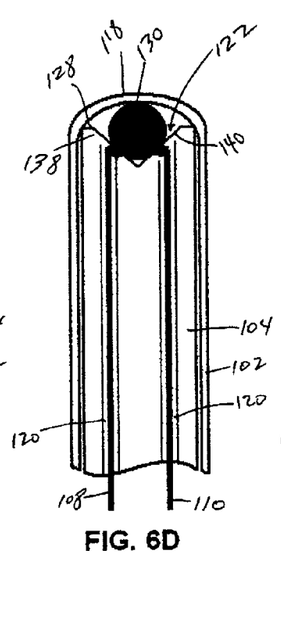
FIG. 6D is a magnified, cross-sectional view of yet another embodiment of a guarded thermocouple junction.
Figure 6E:
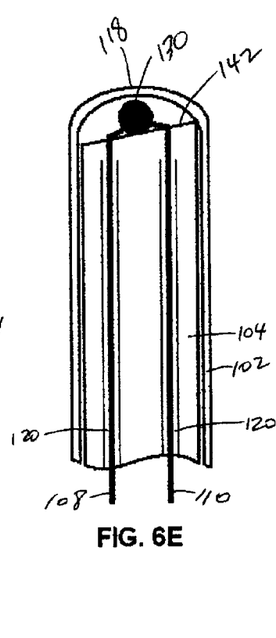
FIG. 6E is a magnified, cross-sectional view of a further embodiment of a guarded thermocouple junction.

FIGS. 6A-6D illustrate the thermocouple junction 130 contacting the inner surface of the sheath 102, and FIG. 6E illustrates the thermocouple junction 130 located in a spaced-apart relationship relative to the sheath. It should be understood by one skilled in the art that the thermocouple assembly 100 can be assembled such that the thermocouple junction 130 is either in contact with or immediately adjacent to the sheath 102, but the thermocouple junction 130 remains in a substantially fixed location or position relative to the measuring tip 118 without being subject to a spring force from the spring 112. For example, in an embodiment, the thermocouple junction 130 is positioned within recessed region 122 such that the thermocouple junction 130 is in contact with inner surface of the sheath 102 at the measuring tip 118. However, because spring 112 biases the support member 104 against the inner surface of the sheath, the thermocouple junction 130 remains stationary and experiences no spring force against the sheath 102 from the spring 112. In another embodiment, the junction is positioned in a spaced-apart manner immediately adjacent to the inner surface of the sheath 102.

In another embodiment of the thermocouple assembly 100, illustrated in FIG. 6B, the recessed region 122 includes a side surface 132 and a base 134. The side surface 132 extends from the distal end into the thickness of the support member 104 in a substantially parallel manner relative to the longitudinal axis of the support member 104. The base 134 forms the bottom surface of the recessed region 122 at the end of the support member 104. The base 134 is a planar surface that is formed at a right angle relative to the side surface 132. The recessed region 122 forms a generally cylindrical indentation into the end of the support member 104. The recessed region 122 is surrounded by an edge 128 forming the distal end of the support member 104. In an embodiment, the side surface 132 is spaced radially inward from the outer surface of the support member 104 such that the edge 128 forms a substantially planar ledge.

During assembly, a portion of the first and second wires 108, 110 extend from their corresponding bores 120 into the recessed region 122, as shown in FIG. 6B. The exposed portion of the first and second wires 108, 110 are fused together to form a bead, or thermocouple junction 130. The thermocouple junction 130 is located immediately adjacent to, or in contact with, the base 134 of the recessed region 122 and protected by the side surface 132. Once the thermocouple junction 130 is formed, the support member 104 is inserted into the sheath 102 until the edge 128 contacts the inner surface of the sheath 102 at the measuring tip 118. When assembled, the thermocouple junction 130 is located at a substantially fixed location relative to the measuring tip 118 of the sheath 102.

In the embodiment illustrated in FIG. 6C, the recessed region 122 includes a sloped surface 136. The sloped surface 136 is sloped inwardly toward the longitudinal axis of the support member 104 as the sloped surface 136 extends away from the distal end of the support member 104. The recessed region 122 forms a generally semi-spherical indentation into the end of the support member 104. The recessed region 122 is surrounded by an edge 128 forming the distal end of the support member 104. In an embodiment, the sloped surface 136 is spaced radially inward from the outer surface of the support member 104 such that the edge 128 forms a substantially planar ledge. In another embodiment, the sloped surface 136 extends from the outer surface of the support member 104 such that the distal end of the support member 104 forms a circular ring. In an embodiment, the recessed region 122 can be formed when molding the support member 104. In another embodiment, the recessed region 122 can be formed by cutting or grinding out a portion of the support member 104. It should be understood by one skilled in the art that the recessed region 122 can be formed by any manner sufficient to provide side walls 138 configured to guard the thermocouple junction 130.

During assembly, a portion of the first and second wires 108, 110 extend from their corresponding bores 120 into the recessed region 122, as shown in FIG. 6C. The exposed portion of the first and second wires 108, 110 are fused together to form a bead, or thermocouple junction 130. The thermocouple junction 130 is located immediately adjacent to, or in contact with, the base of the recessed region 122 and protected by the sloped surface 136. Once the thermocouple junction 130 is formed, the support member 104 is inserted into the sheath 102 until the edge 128 contacts the inner surface of the sheath 102 at the measuring tip 118. When assembled, the thermocouple junction 130 is located at a substantially fixed location relative to the measuring tip 118 of the sheath 102.

In the embodiment illustrated in FIG. 6D, the recessed region 122 includes an angled surface 140. The angled surface 140 is sloped inwardly toward the longitudinal axis of the support member 104 as the angled surface 140 extends away from the distal end of the support member 104, and the angled surface 140 forms a point on, or substantially near, the longitudinal axis of the support member 104. The recessed region 122 forms a generally v-shaped, or conical, indentation into the end of the support member 104. The recessed region 122 is surrounded by an edge 128 forming the distal end of the support member 104. In an embodiment, the angled surface 140 is spaced radially inward from the outer surface of the support member 104 such that the edge 128 forms a substantially planar ledge. In another embodiment, the sloped surface 136 extends from the outer surface of the support member 104 such that the edge 128 forms a ledge having little or no thickness extending radially inward. In an embodiment, the recessed region 122 can be formed by cutting or grinding the angled surface 140 into the end of the support member 104. It should be understood by one skilled in the art that the recessed region 122 can be formed by any manner sufficient to provide a side wall 138 configured to guard the thermocouple junction 130.

During assembly, a portion of the first and second wires 108, 110 extend from their corresponding bores 120 into the recessed region 122, as shown in FIG. 6D. The exposed portion of the first and second wires 108, 110 are fused together to form a bead, or thermocouple junction 130. The thermocouple junction 130 is located immediately adjacent to the point formed by the angled surface 140 as the angled surface 140 extends radially inward. Once the thermocouple junction 130 is formed, the support member 104 is inserted into the sheath 102 until the edge 128 contacts the inner surface of the sheath 102 at the measuring tip 118. When assembled, the thermocouple junction 130 is located at a substantially fixed location relative to the measuring tip 118 of the sheath 102.

The recessed regions 122 illustrated in FIGS. 6A-6D are shown to be indentations that are substantially symmetric about the longitudinal axis of the support member 104. However, it should be understood by one skilled in the art that the end of the support member 104 does not need to include a recessed region or be symmetric about the longitudinal axis. For example, FIG. 6E illustrates an embodiment in which the end of the support member is truncated such that the sloped surface 142 of the support member is substantially planar and formed at an angle relative to the longitudinal axis of the support member 104. It should be understood by one skilled in the art that the end of the support member 104 adjacent to which the thermocouple junction 130 is formed may be planar, include an indentation or recessed region, or be shaped in any manner that allows the thermocouple junction 130 to be consistently located relative to the inner surface of the sheath 102 at the measuring tip 118.

In an embodiment, the thermocouple junction 130 is in an abutting relationship with the inner surface of the sheath 102 at the measuring tip 118, as shown in FIGS. 6A-6E. The contact between the side walls 138 of the support member 104 and the sheath 102 absorbs nearly all of the spring force applied to the support member 104 by the spring 112 such that there is substantially no spring force biasing the thermocouple junction 130 against the measuring tip 118. Because the spring force is absorbed by the contact between the support member 104 and the sheath 102, the thermocouple junction 130 may remain in a substantially fixed location in contact with the measuring tip 118 without slipping or becoming deformed. In another embodiment, as shown in FIG. 6E, the thermocouple junction 130 is located immediately adjacent to the inner surface of the sheath 102 at the measuring tip 118, thereby providing a minute gap between the thermocouple junction 130 and the sheath 102. It should be understood by one skilled in the art that the thermocouple junction 130 can be in contact with, or spaced apart from, the inner surface of the sheath 102 at the measuring tip 118, wherein the contact between the support member 104 and the sheath 102 is configured to reduce or eliminate the spring force that is typically biases the thermocouple junction 130 against the measuring tip 118 so as to allow the thermocouple junction 130 to remain in a substantially fixed location relative to the measuring tip 118 from thermocouple to thermocouple.

In the embodiment illustrated in FIG. 6E, the distance at which the thermocouple junction 130 is spaced-apart from the inner surface of the sheath 102 at the measuring tip 118 is about 1 mm. In another embodiment, the distance at which the thermocouple junction 130 is spaced-apart from the inner surface of the sheath 102 at the measuring tip 118 is about 0.5 mm. In yet another embodiment, the distance at which the thermocouple junction 130 is spaced-apart from the inner surface of the sheath 102 at the measuring tip 118 is less than about 5 mm, and more particularly, less than about 1 mm.

In another embodiment, the distance between the thermocouple junction 130 and the inner surface of the sheath 102 at the measuring tip 118 is between about 0.1 and 1.5 mm. The spaced apart distance between the thermocouple junction 130 and the measuring tip 118 can be any distance, but the spaced-apart distance should be easily maintainable between subsequently-produced thermocouples such that the spaced-apart distance between the thermocouple junction 130 and the measuring tip 118 for each thermocouple assembly 100 is substantially the same.

As illustrated in FIGS. 6A-6D, the thermocouple junction 130 is located at the base of the recessed region 122 formed in the support member 104. When located adjacent to the base of the recessed region 122, the spring 112 does not introduce a compression force into the thermocouple junction 130 as the spring 112 biases the support member 104 toward the measuring tip 118 of the thermocouple assembly 100. In center thermocouples commonly known in the art, the spring biases the junction into contact with the measuring tip to maintain contact between the junction and measuring tip. However, this spring force exerted on the junction compresses the junction against the inner surface of the sheath and typically causes the deformation of the junction that may result in errors in temperature measurements and premature failure of the thermocouple. In contrast, the thermocouple junction 130 of the improved thermocouple assembly 100 of the present invention is able to remain in a substantially fixed position within the recessed region 122 and in contact with, or immediately adjacent to, the sheath 102 at the measuring tip 118 such that the thermocouple junction 130 does not slide or become offset relative to the measuring tip 118 which may otherwise result if the thermocouple junction 130 were under constant compression between the support member 104 and the sheath 102 by the spring force from the spring 112. Because the thermocouple junction 130 remains in a substantially fixed location within the recessed region 122 of the support member 104 without sliding or becoming offset relative to the sheath 102, the temperature data provided by the thermocouple assembly 100 remains consistent. Further, preventing accidental sliding or the offset of the thermocouple junction 130 relative to the sheath 102 also increases the lifetime of the thermocouple assembly 100, because the temperature data of the thermocouple assembly 100 remains consistent after more thermal cycles within the reaction chamber 12.

The recessed region 122 is a generally indented region formed into the distal end of the support member 104 of the thermocouple assembly 100. In the embodiments illustrated in FIGS. 6A-6D, the recessed region 122 is substantially symmetric about the longitudinal axis of the support member 104. It should be understood by one skilled in the art that the recessed region 122 may be non-symmetrical about the longitudinal axis of the support member 104. It should also be understood by one skilled in the art that the shape of the recessed region 122 can be any shape sufficient to substantially surround the thermocouple junction 130 disposed at the base of the recessed region 122. The indentation formed by the recessed region 122 forms a side wall 138 extending from the base of the recessed region 122 toward the distal end of the support member 104 such that the side wall 138 completely surrounds the junction. In addition to maintaining the thermocouple junction 130 in a substantially fixed location relative to the measuring tip 118 of the sheath 102, the side walls 138 of the recessed region 122 provides protection to the thermocouple junction 130 from the radiant heat produced by the heating elements 16 (FIG. 1). Thus, the thermocouple junction 130 is shielded from direct radiation, thereby reducing the damage to the thermocouple junction 130 and the portion of the exposed first and second wires 108, 110 within the recessed region 122.

As illustrated in FIGS. 6A-6E, the measuring tip 118 of the sheath 102 is formed as a curved tip at a distal end of the sheath 102. In alternative embodiments, the measuring tip 118 can be formed substantially perpendicular to the side walls 138 of the sheath 102. It should be understood by one skilled in the art that the shape of the measuring tip 118 may be formed as any shape. The junction being formed at a substantially fixed location at the base of the recessed region 122 as well as the contact between the edge 128 of the support member 104 and the inner surface of the sheath 102 at the measuring tip 118 allow the thermocouple junction 130 to be located in substantially the same position relative to the measuring tip 118 during manufacture of subsequent thermocouples 100. Because the thermocouple junction 130 is maintained at a substantially fixed location within the recessed region 122, the relationship between the thermocouple junction 130 and the measuring tip 118 remains substantially constant. One of the important variables in manufacturing thermocouples is the ability to consistently maintain the thermocouple junction 130 at a substantially fixed position relative to the measuring tip 118 of the sheath 102. The ability to provide a substantially consistent position of the thermocouple junction 130 relative to the measuring tip 118 of the thermocouple in subsequently-produced provides an improvement over the thermocouples commonly known in the art in which the junction may slide, become compressed and flatten out, or become offset at the distal end of the support member during manufacture or thermal cycling within the reaction chamber.

While preferred embodiments of the present invention have been described, it should be understood that the present invention is not so limited and modifications may be made without departing from the present invention. The scope of the present invention is defined by the appended claims, and all devices, process, and methods that come within the meaning of the claims, either literally or by equivalence, are intended to be embraced therein.

What is claimed is:

1. A temperature control system for use in a semiconductor processing reactor comprising:
    at least one heating element located within said reactor;
    a controller operatively connected to said at least one heating element, said controller configured to control said at least one heating element; and
    at least one temperature sensor located within said reactor, said at least one temperature sensor operatively connected to said controller for providing temperature data to said controller, wherein said at least one temperature sensor comprises a thermocouple assembly, said thermocouple assembly comprising:
        a sheath having a measuring tip located at a distal end of said sheath;
        a support member, wherein at least a portion of said support member is received within said sheath;
        a first wire and a second wire formed of dissimilar metals, a portion of said first and second wires received within said support member, and an end of each of said first and second wires being fused together to form a thermocouple, unction therebetween; and
        a recessed region formed in a distal end of said support member, the recessed region comprising a bottom surface distal to the measuring tip and an open end proximate to the measuring tip, wherein said thermocouple junction is located between the bottom surface of the recessed region of the support member and the measuring tip of the sheath at a substantially fixed position relative to said measuring tip of said sheath.

2. The temperature control system of claim 1, wherein said recessed region forms a side wall that surrounds said thermocouple junction, thereby guarding said thermocouple junction from direct radiant energy from said at least one heating element.

3. The temperature control system of claim 1, wherein said recessed region is formed as a substantially semi-spherical indentation in said distal end of said support member.

4. The temperature control system of claim 1, wherein said recessed region is formed as a substantially cylindrical indentation in said distal end of said support member.

5. The temperature control system of claim 1, wherein said recessed region is formed as a planar surface, said planar surface being oriented at an angle relative to a longitudinal axis of said support member.

6. The temperature control system of claim 1 further comprising an edge formed about said recessed region at said distal end of said support member, and said edge contacts an inner surface of said sheath to provide said spaced apart distance between said thermocouple junction and said measuring tip.

7. The temperature control system of claim 6, wherein the edge is a ledge extending in a substantially perpendicular manner relative to a longitudinal axis of said support member.

8. The temperature control system of claim 1, wherein he thermocouple junction is positioned less than 5 mm from the measuring tip of the sheath.

9. The temperature control system of claim 1, wherein the thermocouple junction is positioned less than 1 mm from the measuring tip of the sheath.

* * * * *